(12) United States Patent
Ono et al.

(10) Patent No.: US 10,532,623 B2
(45) Date of Patent: Jan. 14, 2020

(54) SUSPENSION OF MOTORCYCLE

(71) Applicant: HONDA MOTOR CO., LTD., Tokyo (JP)

(72) Inventors: Kazuhiko Ono, Wako (JP); Hiroyuki Kaneta, Wako (JP); Yoshiaki Nedachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 194 days.

(21) Appl. No.: 15/876,879

(22) Filed: Jan. 22, 2018

(65) Prior Publication Data

US 2018/0215229 A1 Aug. 2, 2018

(30) Foreign Application Priority Data

Jan. 30, 2017 (JP) .................................. 2017-014286

(51) Int. Cl.
*B60G 17/016* (2006.01)
*B60G 17/015* (2006.01)
*B60G 17/018* (2006.01)
*B60G 17/019* (2006.01)
(Continued)

(52) U.S. Cl.
CPC ....... *B60G 17/0164* (2013.01); *B60G 17/018* (2013.01); *B60G 17/0152* (2013.01); *B60G 17/01908* (2013.01); *B60G 17/06* (2013.01); *B62K 25/283* (2013.01); *B60G 2300/12* (2013.01); *B60G 2400/106* (2013.01);
(Continued)

(58) Field of Classification Search
CPC ............ B60G 17/0164; B60G 2300/12; B60G 2500/10
See application file for complete search history.

(56) References Cited

U.S. PATENT DOCUMENTS 6,502,837 B1 * 1/2003 Hamilton ........... B60G 17/0152
280/5.515
2002/0103587 A1 * 8/2002 Kim ..................... B60G 17/016
701/37
(Continued)

FOREIGN PATENT DOCUMENTS

EP 2410203 A2 1/2012
JP H08-216643 A 8/1996
(Continued)

OTHER PUBLICATIONS

European Search Report dated Jun. 29, 2018, 12 pages.
(Continued)

*Primary Examiner* — Tony H Winner
(74) *Attorney, Agent, or Firm* — Rankin, Hill & Clark LLP

(57) ABSTRACT

An ECU controls the damping force at the time of the expansion movement and contraction movement of the front fork. When detecting at least that the motorcycle is in a state of making a stop and the brake hydraulic sensor shows an output of more than or equal to a predetermined value, the ECU carries out a damping force reducing control for minimizing the damping force of the front fork. The ECU takes the following sequential steps of: sensing a start of an expansion movement of the front suspension after starting the damping force reducing control, sensing a termination of the expansion movement of the front suspension, and terminating the damping force reducing control.

17 Claims, 4 Drawing Sheets

(51) Int. Cl.
 B60G 17/06 (2006.01)
 B62K 25/28 (2006.01)
(52) U.S. Cl.
 CPC .. *B60G 2400/204* (2013.01); *B60G 2400/252* (2013.01); *B60G 2400/31* (2013.01); *B60G 2500/10* (2013.01)

(56) References Cited

U.S. PATENT DOCUMENTS

| | | | |
|---|---|---|---|
| 2014/0084528 A1* | 3/2014 | Murakami | B60G 17/0272 267/221 |
| 2015/0057885 A1* | 2/2015 | Brady | B60G 17/06 701/38 |
| 2015/0259028 A1* | 9/2015 | Ishikawa | B62K 25/08 280/6.152 |
| 2016/0114644 A1 | 4/2016 | Morita | |
| 2016/0272032 A1 | 9/2016 | Nedachi | |

FOREIGN PATENT DOCUMENTS

| | | |
|---|---|---|
| JP | 2006-076318 | 3/2006 |
| JP | 2011-173503 A | 9/2011 |

OTHER PUBLICATIONS

Unknown; "Cannot Reverse (walk backwards)" Sep. 10, 2016; XP055484431, retrieved from the Internet: URL: https://www.reddit.com/r/motorcycles/comments/521ho7/cannot_reverse_walk_backwards/; 6 pages.

\* cited by examiner

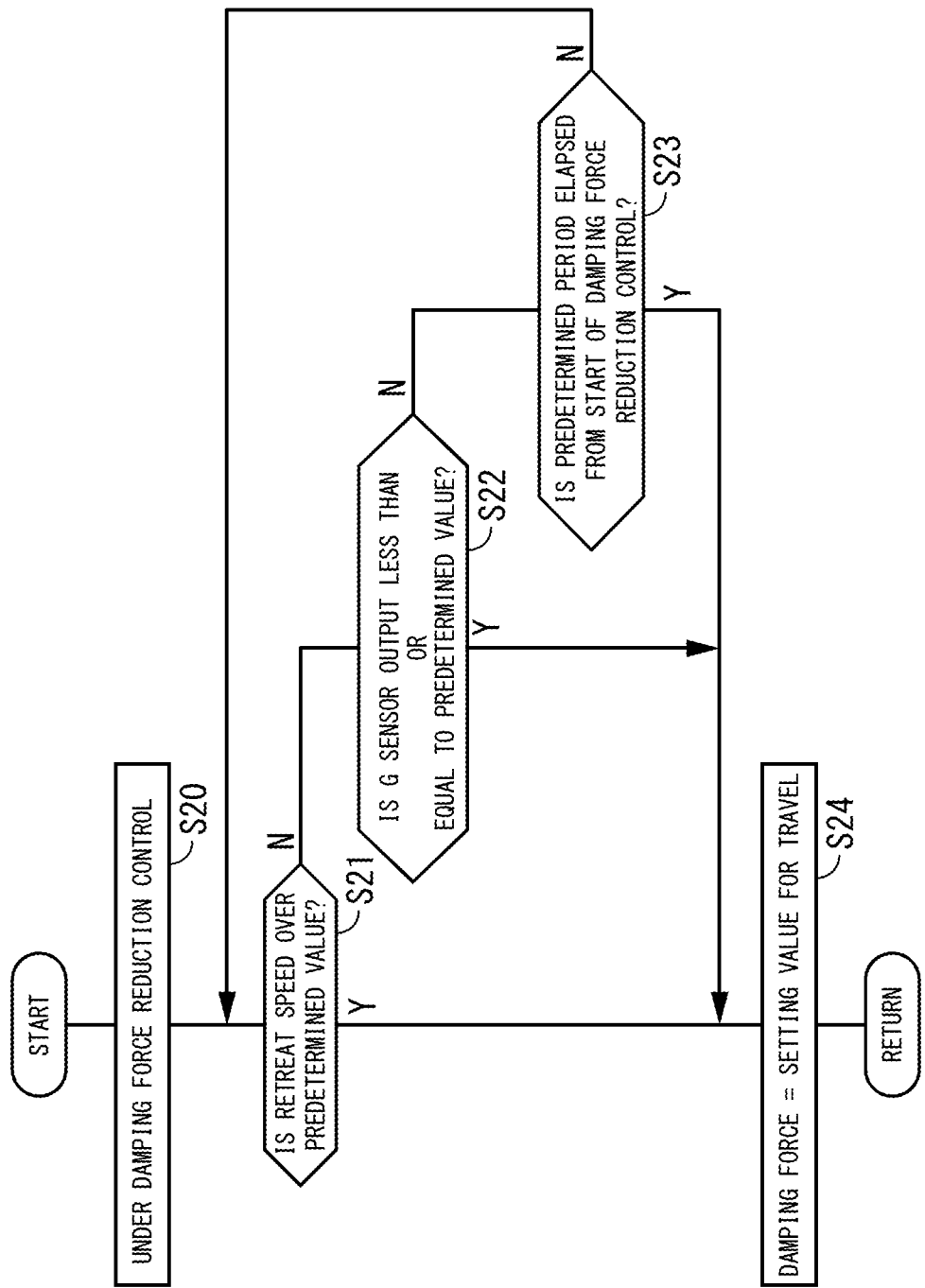

SUSPENSION OF MOTORCYCLE

CROSS-REFERENCE TO RELATED APPLICATIONS

The present application claims priority under 35 USC 119 to Japanese Patent Application No. 2017-014286 filed Jan. 30, 2017 the entire contents of which are hereby expressly incorporated by reference.

TECHNICAL FIELD

This invention relates to a suspension of a motorcycle, and especially relates to a suspension of the motorcycle capable of adjusting, with electronic control, a damping force generated by a damper mechanism.

BACKGROUND ART

Conventionally, such a structure is known as that a suspension supports a wheel to a body such as four-wheeled vehicles, two-wheeled vehicles, and the like and absorbs a vibration caused at the time of travel. The known structure also features that a damping force of the suspension is made adjustable with electronic control.

Patent Literature 1 discloses a suspension capable of varying a damping force. The suspension is used for four-wheeled vehicles. The suspension is capable of adjusting the damping force with a solenoid valve driven by electric power. For a predetermined period even after a power switch of the vehicle is turned off, the damping force like the damping force during travel is kept to suppress the body's vibration caused by riding-on/getting-off of an occupant or by loading/unloading of a baggage.

CITATION LIST

Patent Literature

Patent Document 1: JP 2006-076318 A

SUMMARY OF INVENTION

Technical Problem

By the way, when the motorcycle which is not provided with a reverse gear is driven backward, there is a case in which a reverse operation is small for converting a direction. In such a case, rather than pushing the motorcycle after the getting-off from the motorcycle, driving the motorcycle backward in such a manner as that the occupant strides over the motorcycle and walks with both feet is convenient. Such a convenient occasion takes place so often. In this case, if a seat is so high that the occupant's leg cannot hold on or if the road surface is inclined downward, there is an effective method for such occasions. That is, pressing a steering handlebar frontward while applying a front wheel brake to thereby contract a front suspension, and then releasing the front wheel brake when the front suspension is expanded by a reaction to the contracting operation, to thereby additionally apply the reaction of the front suspension to the retreating force of the motorcycle.

However, this method has a problem. That is, setting a large damping force of the front suspension makes it difficult to expand and/or contract the front suspension in a short time, thus making it difficult to obtain a large reaction. In this respect, it is conceivable to change the damping force by using such a damping-force-variable front suspension as shown in Patent Literature 1. However, Patent Literature 1 fails to consider any control mode which is suitable when the motorcycle is driven backward.

It is an object of the present invention to solve the above conventional problem and to thereby provide a suspension of a motorcycle capable of facilitating the retreat of the motorcycle with the occupant striding over the motorcycle.

Solution to Problems

To achieve the afore-mentioned object, the present invention has a first feature in that a suspension of a motorcycle (1) comprising: a front suspension (4) for axially supporting a front wheel (WF); a spring (41) for giving a reactive force to an expansion movement and a contraction movement of the front suspension (4); a damping force generator (42) for giving a damping force to the expansion movement and contraction movement of the front suspension (4); a front wheel brake device (BF) for giving a braking force to the front wheel (WF); and a brake sensor (43) for sensing an operation state of the front wheel brake device (BF), wherein the front suspension (4) is so configured that a control device (50) controls the damping force at the time of the expansion movement and contraction movement, and when detecting at least that the motorcycle (1) is in a state of making a stop and the brake sensor (43) shows an output of more than or equal to a predetermined value, the control device (50) carries out a damping force reducing control for reducing the damping force of the front suspension (4).

The present invention has a second feature in that the damping force reducing control is a control for reducing the damping force on a compression side of the front suspension (4).

The present invention has a third feature in that the damping force reducing control is a control for reducing the damping force on an expansion side of the front suspension (4).

The present invention has a fourth feature in that the damping force reducing control is a control for reducing both of the damping force on a compression side of the front suspension (4) and the damping force on an expansion side of the front suspension (4).

The present invention has a fifth feature in that the damping force reducing control is a control for minimizing the damping force of the front suspension (4).

The present invention has a sixth feature in that the suspension of a motorcycle (1) further comprises a stroke sensor (40) for sensing a stroke amount of the front suspension (4), wherein the control device (50) takes the following sequential steps of: sensing a start of an expansion movement of the front suspension (4) after starting the damping force reducing control, sensing a termination of the expansion movement of the front suspension (4), and terminating the damping force reducing control.

The present invention has a seventh feature in that the suspension of a motorcycle (1) further comprises a timer (54) for measuring a time elapsed from when the brake sensor (43) shows the output value capable of determining that an operation of the front wheel brake device (BF) is released, after starting the damping force reducing control, wherein the control device (50) terminates the damping force reducing control when the elapsed time reaches a predetermined value.

Advantageous Effects of Invention

According to the first feature, a suspension of a motorcycle (1) comprising: a front suspension (4) for axially supporting a front wheel (WF); a spring (41) for giving a reactive force to an expansion movement and a contraction movement of the front suspension (4); a damping force generator (42) for giving a damping force to the expansion movement and contraction movement of the front suspension (4); a front wheel brake device (BF) for giving a braking force to the front wheel (WF); and a brake sensor (43) for sensing an operation state of the front wheel brake device (BF), wherein the front suspension (4) is so configured that a control device (50) controls the damping force at the time of the expansion movement and contraction movement, and when detecting at least that the motorcycle (1) is in a state of making a stop and the brake sensor (43) shows an output of more than or equal to a predetermined value, the control device (50) carries out a damping force reducing control for reducing the damping force of the front suspension (4). Therefore, the occupant presses a steering handlebar forward while applying the front wheel brake in a stop state to thereby contract the front suspension, and then the occupant retreats the motorcycle by using the reaction of the front suspension. In the above retreat operation of the motorcycle, the damping force accompanying the expansion movement and contraction movement of the front fork is reduced to thereby make it easy to obtain the reaction by the spring. This allows the occupant to easily drive the motorcycle backward with the occupant striding over the motorcycle.

According to the second feature, the damping force reducing control is a control for reducing the damping force on a compression side of the front suspension (4). Therefore, operation for contracting the front suspension by pressing forward the steering handlebar while applying the front wheel brake is facilitated, thus making it easy to obtain a large reaction by the spring.

According to the third feature, the damping force reducing control is a control for reducing the damping force on an expansion side of the front suspension (4). Therefore, the contracted front suspension becomes easy to expand, thus making it easy to use the reaction of the spring for the retreat operation of the motorcycle.

According to the fourth feature, the damping force reducing control is a control for reducing both of the damping force on a compression side of the front suspension (4) and the damping force on an expansion side of the front suspension (4). Therefore, the front suspension becomes easy to make the expansion movement and contraction movement, thus making it easy to obtain a large reaction by the spring and also making it easy to use the reaction of the spring for the retreat operation of the motorcycle.

According to the fifth feature, the damping force reducing control is a control for minimizing the damping force of the front suspension (4). Thus making it easy to obtain a large reaction by the front suspension.

According to the sixth feature, the suspension of a motorcycle (1) further comprises a stroke sensor (40) for sensing a stroke amount of the front suspension (4), wherein the control device (50) takes the following sequential steps of: sensing a start of an expansion movement of the front suspension (4) after starting the damping force reducing control, sensing a termination of the expansion movement of the front suspension (4), and terminating the damping force reducing control. Therefore, it is determined that the front fork which started expanding by the reaction has come to an expansion limit to thereby terminate one expansion-contraction movement, the process terminates the damping force reducing control, thus making it possible to immediately return the damping force reducing control to a damping force proper for the retreat operation with a reaction and for an ordinary travel.

According to the seventh feature, the suspension of a motorcycle (1) further comprises a timer (54) for measuring a time elapsed from when the brake sensor (43) shows the output value capable of determining that an operation of the front wheel brake device (BF) is released, after starting the damping force reducing control, wherein the control device (50) terminates the damping force reducing control when the elapsed time reaches a predetermined value. Therefore, it is determined that a predetermined period has elapsed from the releasing of the front wheel brake device and thereby the occupant has no intention for causing the reaction for the retreat, thus making it possible to terminate the damping force reducing control.

BRIEF DESCRIPTION OF DRAWINGS

FIG. 4 is a flowchart showing a procedure for terminating the damping force reducing control according to the present invention.

DESCRIPTION OF EMBODIMENTS

Figure 1:
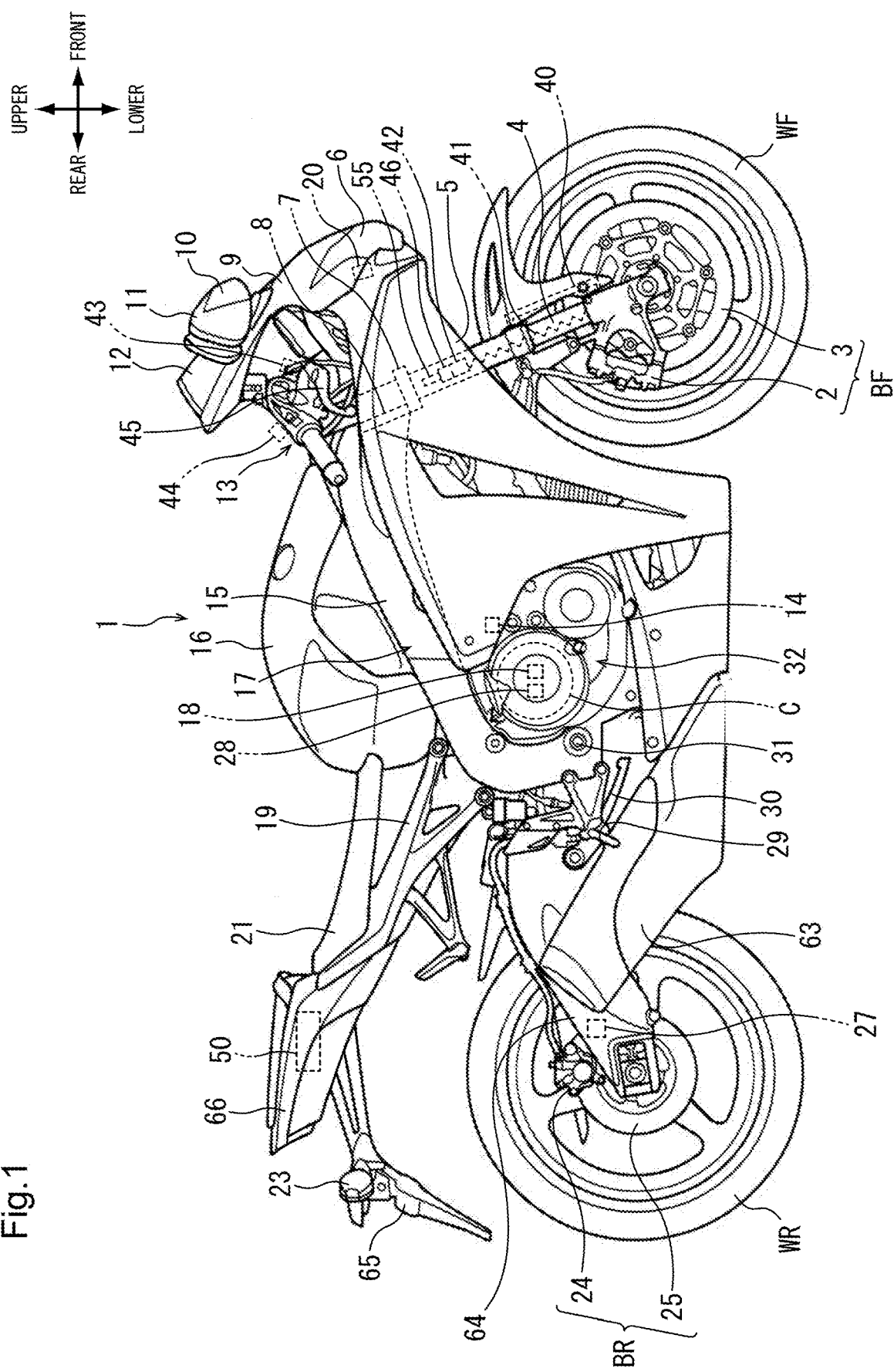
FIG. 1 is a right side view of a motorcycle to which a suspension of the motorcycle according to the present embodiment is applied.

Hereinafter, referring to drawings, an explanation will be made in detail about preferred embodiment of the present invention. FIG. 1 is a right side view of a motorcycle 1 to which a suspension of the motorcycle according to the present embodiment is applied. The motorcycle 1 is a saddle-ride type vehicle. In the motorcycle 1, a fuel tank 16 is arranged between a steering handlebar 13 and a seat 21. The steering handlebar 13 is for steering a front wheel WF. An occupant rides on the seat 21. A head pipe 8 is provided at the front end of a main frame 15 constituting a body frame 17. A front fork 4 is supported to the head pipe 8 in a swingable manner. The front fork 4 is a front suspension. The front wheel WF is axially supported to the front fork 4 such that the front wheel WF rotates freely. A pair of right and left front forks 4 are fixed to a top bridge (not shown) and a bottom bridge 7 which are respectively positioned above and below the head pipe 8. A stem shaft (not shown) is fixed to the top bridge and the bottom bridge 7. Making the stem shaft to be axially supported to the head pipe 8 in a swingable manner can bring about a structure capable of steering the front wheel WF. The front wheel WF has a front brake BF including a brake caliper 2 and a brake disk 3. A brake lever 45 is mounted to the right side of the steering handlebar 13. The brake lever 45 operates the front brake BF.

A rear wheel WR is pivotally supported to a swing arm 64 in a rotatable manner. The front end portion of the swing arm 64 is axially supported to a pivot 31 in a swingable manner. The pivot 31 is provided in a rear lower portion of the main frame 15. An engine 32 is suspended below the main frame 15. A driving force of the engine 32 is transmitted to the rear wheel WR via a drive chain (not shown). A combustion gas of the engine 32 is exhausted from a muffler 63. The rear wheel WR has a rear wheel brake BR. The rear wheel brake BR includes a brake caliper 24 and a brake disk 25. A vehicle velocity sensor 27 is provided in the swing arm 64's position closer to the back. From a rotational condition of the rear wheel WR, the vehicle velocity sensor 27 senses a vehicle velocity. A footrest step 29 and a rear brake pedal 30 are mounted behind the pivot 31. The rear brake pedal 30 operates the rear wheel brake BR.

The front of the steering handlebar 13 is covered with a front cowl 9 in which a head light 6 is buried. A windscreen 12 is mounted to an upper end of the front cowl 9. A rear view mirror 11 is mounted to each of right and left sides in the vehicle width direction. The rear view mirror 11 is integrated with a blinker device 10. A pair of right and left side cowls 5 are arranged below the front cowl 9, showing a configuration to cover the upper portion and front portion of the engine 32 from a side of the front fork 4 and from a lower end portion of the main frame 15.

A rear frame 19 is fixed to the upper portion at the rear end of the main frame 15. The seat 21 and a seat cowl 66 are supported to the rear frame 19. A rear fender 65 is mounted to the lower portion of the seat cowl 66. The rear fender 65 supports a pair of right and left blinker devices 23.

A fork spring 41 and a damper mechanism 42 are received in the front fork 4. The fork spring 41 biases the front fork 4 in an expanding direction. The damper mechanism 42 works as a damping force generator for giving an arbitrary damping force to the expansion movement and contraction movement of the front fork 4. The damper mechanism 42 according to the present embodiment is of a hydraulic type for generating a damping force with a resistance caused at the time when a damper oil passes through an orifice. The damper mechanism 42 is so configured that adjusting a diameter of the orifice can vary the damping force. Further, according to the present embodiment, the front fork 4 has a structure as an electronic-control front suspension. The electronic-control front suspension is capable of varying the diameter of the orifice of the front fork 4 with a control solenoid operated based on an instruction of an ECU 50. The electronic-control front suspension is also capable of automatically varying the damping force based on various sensor signals, etc. Further, the damping mechanism 42 according to the present embodiment is so configured that a compression-side damping force and an expansion-side damping force can be separately adjusted. The compression-side damping force is caused at the time of contracting of the front fork 4. The expansion-side damping force is caused at the time of expanding of the front fork 4.

The ECU 50 as a control device is arranged in the seat cowl 66. The ECU 50 controls ignition timing, fuel injection quantity, etc. of the engine 32. Further, the ECU 50 electronically controls the damping force of the front fork 4. Various sensors are provided in the body of the motorcycle 1. Based on output signals of the various sensors, the ECU 50 can adjust the damping force of the front fork 4.

The front fork 4 is of a telescopic type (fall and stand) in which an inner tube is disposed at a lower side of an outer tube. A stroke sensor 40 is mounted to the front fork 4. The stroke sensor 40 senses a stroke amount of the front fork 4. According to the present embodiment, setting is so made that an expansion amount from the full-contraction position is sensed as the stroke amount. Based on an operation using the time measured with a timer, the ECU 50 also recognizes a per-period shift amount of the stroke amount.

In the vicinity of the steering handlebar 13, an IG (ignition) switch 44 is disposed. The IG switch 44 is a power source switch of the motorcycle 1. A starter switch (not shown) is provided in the steering handlebar 13. In a state in which the power source is turned on by switching the IG switch 44 to an on-state, operating the starter switch starts the engine 32. Further, a G sensor (acceleration sensor) 20 is disposed inside the front cowl 9. According to the expansion movement and contraction movement of the front fork 4, the front portion of the vehicle shows a longitudinal movement. The G sensor 20 senses the longitudinal movement.

The front brake BF is of a hydraulic disk type operated with a hydraulic pressure caused by a master cylinder (not shown). A brake hydraulic sensor 43 as a brake sensor is mounted to the master cylinder. The master cylinder is a hydraulic pressure generating mechanism disposed in the base portion of the brake lever 45. Based on an output signal of the brake hydraulic sensor 43, the ECU 50 can sense the operating state of the front wheel brake BF.

A clutch C is disposed in the engine 32. The clutch C works to connect and disconnect the driving force between a crankshaft (not shown) and a transmission (not shown). In the vicinity of the clutch C, a clutch sensor 18 and a neutral sensor 28 are disposed. The clutch sensor 18 senses an operating condition of the clutch C. The neutral sensor 28 senses a neutral condition of the transmission. The clutch sensor 18 may include a stroke sensor, a hydraulic sensor, etc. The stroke sensor senses a stroke of an operational rod of the clutch. The hydraulic sensor senses an operational oil of the clutch. Further, the neutral sensor may include a rotary sensor, a switch, etc. The rotary sensor senses a rotational position of a shift drum. An Ne sensor 14 senses a revolution of the engine. The Ne sensor 14 may include a crank pulsar sensing system and a timer. The crank pulsar sensing system senses a rotational condition of the crankshaft.

Herein, in accordance with the occupant's riding comfort during travel, the occupant's preference of cornering characteristic, etc., the occupant can set the damping force of the front fork 4 to an arbitrary degree. This setting is made feasible by directly operating the damping force adjusting mechanism 46 provided in the damper mechanism 42. Otherwise, this setting is made feasible by operating the damping force adjusting mechanism 46 via a control solenoid 55 driven with a switch, etc. provided in the steering handlebar 13. A damping force reducing control is to be explained about below. Irrespective of the above set value for travel, the damping force reducing control, when the occupant drives the motorcycle 1 backward by using a reaction of the front fork 4, makes it easy to obtain a large reaction by automatically reducing the damping force of the front fork 4 and returns, at a proper timing, the reduced damping force to the set value for travel.

Figure 2:
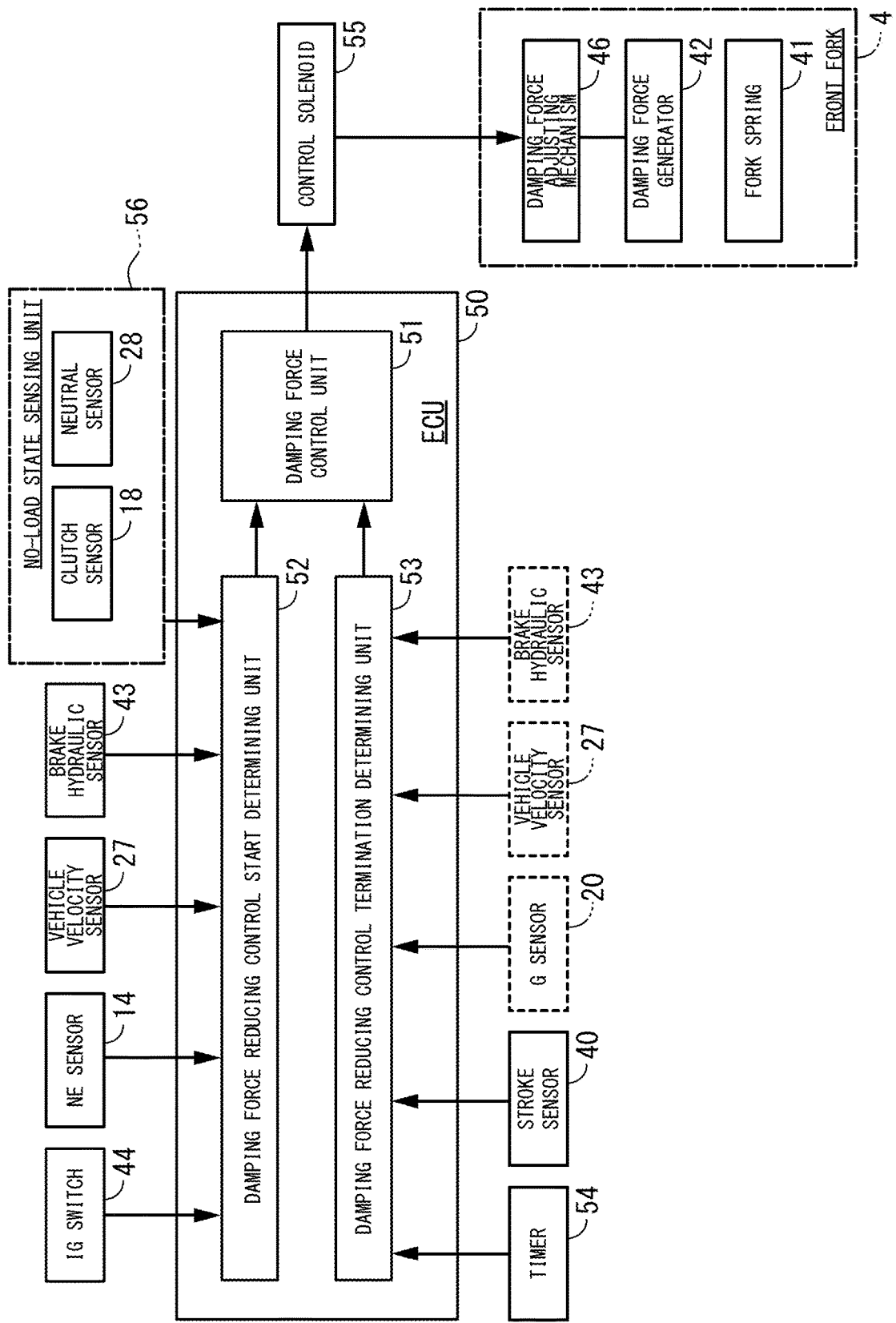
FIG. 2 is a block diagram showing a structure showing an ECU and peripheral devices of the ECU for implementing a damping force reducing control according to the present invention.

FIG. 2 is a block diagram showing a structure showing the ECU 50 and peripheral devices of the ECU 50 for implementing the damping force reducing control according to the present invention. As stated above, the front fork 4 includes the fork spring 41 and the damping force generator (damper mechanism) 42. Also as stated above, the front fork 4 further includes the damping force adjusting mechanism 46 for adjusting the damping force generated by the damping force generator 42. According to this embedment, it is so configured that the damping force adjusting mechanism 46 can be driven with the control solenoid 55.

The ECU 50 includes a damping force control unit 51, a damping force reducing control start determining unit 52 and a damping force reducing control termination determining unit 53. The damping force control unit 51 outputs a drive signal to the control solenoid 55. The damping force reducing control start determining unit 52 determines the timing for starting the damping force reducing control. The damping force reducing control termination determining unit 53 determines the timing for the termination of the damping force reducing control. Any output signals from a timer 54, the IG switch 44, the Ne sensor 14, the vehicle velocity sensor 27, the brake hydraulic sensor 43 and a no-load state sensing unit 56 are inputted to the damping force reducing control start determining unit 52. The no-load state sensing unit 56 includes the clutch sensor 18 and the neutral sensor 28. When the clutch C is in a disconnected state free from transmitting of the drive force or when the transmission is in a neutral state, the damping force reducing control start determining unit 52 recognizes that the engine 32 is in a no-load state. Based on any output signal of each of the above sensors, the damping force reducing control start determining unit 52 determines a state in need of the damping force reducing control and then gives an instruction to the damping force control unit 51 for starting the control.

Further, any output signal from the timer 54, the stroke sensor 40, the G sensor 20, the vehicle velocity sensor 27 and the brake hydraulic sensor 43 are inputted to the damping force reducing control termination determining unit 53. Based on the output signal of each of the sensors above, the damping force reducing control termination determining unit 53 determines the timing for terminating the damping force reducing control, and then gives an instruction to the damping force control unit 51 for the termination of the control. Further, in a basic control flowchart shown in FIG. 3 that follows, only the output signals from the timer 54 and from the stroke sensor 40 determine the timing for terminating the damping force reducing control.

Further, according to the present embodiment, the brake hydraulic sensor 43 for sensing the hydraulic pressure caused to a hydraulic brake line is used for sensing the operating state of the front brake BF. However, other sensors may be used as a brake sensor for sensing the operating state of the front brake BF. Examples of the other sensors include a switch for sensing the swinging state of the brake lever 45, and also include, in the case of the front brake BF of a mechanical type, a sensor for sensing any movement amount of a brake wire.

Figure 3:
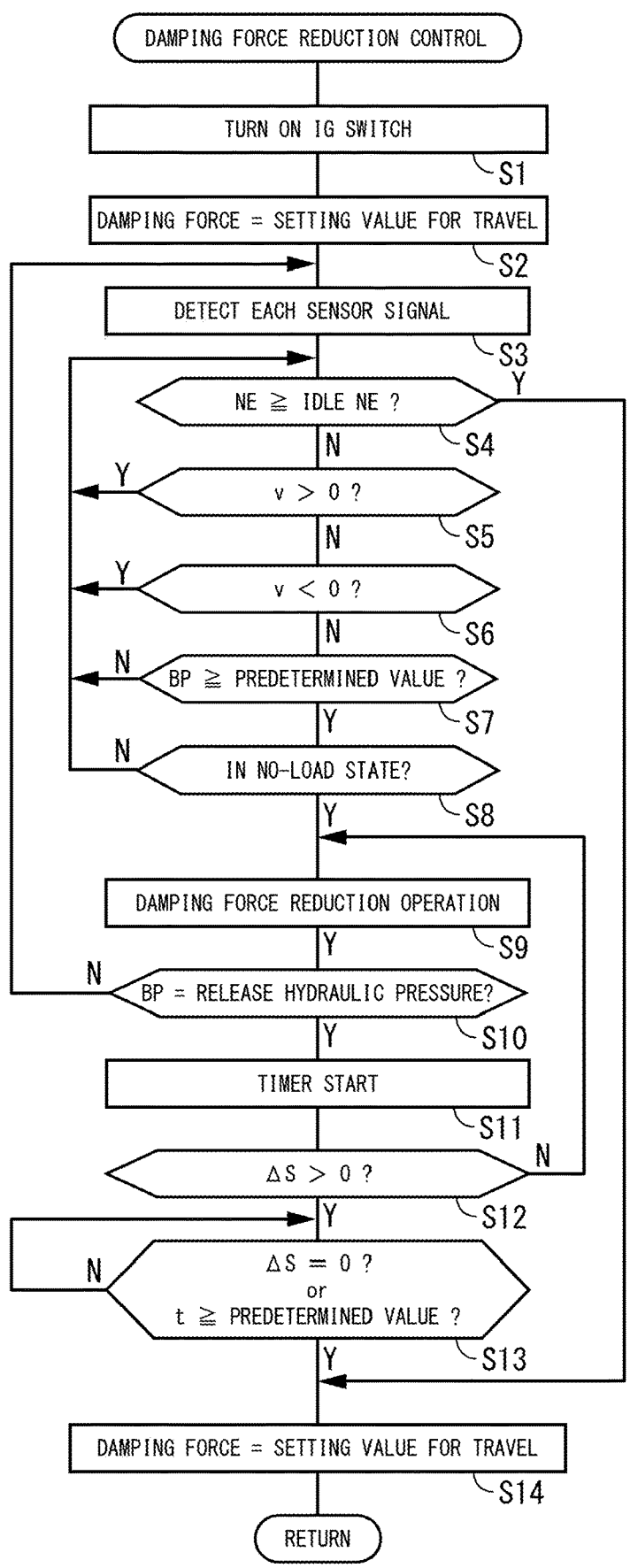
FIG. 3 is a flowchart showing a procedure of a damping force reducing control according to the present invention.

FIG. 3 is a flowchart showing the procedure of the damping force reducing control according to the present invention. In step S1, turning on the IG switch 44 turns on the power source of the motorcycle 1. In step S2, the damping force of the front fork 4 is rendered a set value for travel which is set by the occupant. In step S3, each sensor signal is sensed.

In step S4, a determination is made whether or not an engine speed Ne sensed by the Ne sensor 14 is greater than or equal to an idle Ne as a revolution in an idling state. If the determination is negative, that is, if it is determined that the engine is not started, the process moves to step S5. In step S5, a determination is made whether or not a vehicle velocity v sensed by the vehicle velocity sensor is more than 0. If the determination is negative, that is, if it is determined that the motorcycle 1 is free from making a forward movement, the process moves to step S6. In step 6, a determination is made whether or not the vehicle velocity v is less than 0. If the determination is negative, that is, if it is determined that the motorcycle 1 is free from making a retreat operation, the process moves to step S7. Herein, the determination in each of step S5 and step S6 is for determining whether or not the motorcycle 1 is in a state of stop, and may be replaced with a determination whether or not the vehicle velocity v is within a predetermined a range striding over 0 (for example, −1 km/h<v<1 km/h). A positive determination made in step S4 denotes that the engine is started and the damping force reducing control is not necessary. Then, the process moves to step S13, in which the damping force of the front fork 4 is regarded as the set value for travel which is set by the occupant, followed by the termination of the control operations in series. Further, if the determination in each of step S5 and step S6 is negative, the process moves back to the determination in step S3.

In step S7 that follows, a determination is made whether or not the brake hydraulic pressure BP of the front brake BF sensed with the brake hydraulic sensor 43 is more than or equal to a predetermined value. If the determination is positive, the process moves to step S8. Herein, the predetermined value of the brake hydraulic pressure BP may be set to be a value which generates a braking force that prevents the front wheel WF from rotating even when the front fork 4 is contracted by pressing the steering handlebar 13 frontward. Making this value greater than the value of the braking operation during travel can read the occupant's intention for contracting the front fork 4.

In step S8, according to the output signal of either the clutch sensor 18 or neutral sensor 28 of the no-load state sensing unit 56, a determination is made whether or not the engine 32 is in a no-load state. Further, a determination that a no-load state is formed is made, not only in the case of a neutral state of the transmission, but also in the case that the clutch C is in a state of disconnection rendered by gripping of a clutch lever. Such a determination of the no-load state is due to a supposition that any retreat operation using a reaction of the front fork 4 is made from a state in which the motorcycle is making a stop on a downward slope by gearing of the transmission.

Then, when the determination made in step S8 is positive, the process moves to step S9 to carry out an operation for reducing the damping force. In sum, the above determination in each of steps S4 to S8 is for determining a formation of a state in which, judging from conditions that the IG switch 44 is turned on, the engine 32 is making a stop, the motorcycle 1 is not travelling, the front brake BF is operated and the engine 32 is in the no-load state, the occupant is about to contract the front fork 4 for driving the motorcycle 1 backward.

Herein, the damping force reducing control according to the present embodiment uses the setting that the damping forces on both of the compression side and expansion side of the front fork 4 are each made into the minimum value. However, modes of the damping force control may be deformed in a various manner. For example, another control for reducing the damping force on any one of the compression side and the expansion side is allowed, and the other control for setting the damping force greater than the minimum value is allowed.

In step S10 to step S13 below, a process of determining the timing for the termination of the damping force reducing control is implemented. Preferably, the damping force reducing control is immediately terminated along with the completion of the retreat operation using the reaction of the front fork 4. Due to this, according to the present embodiment, it is so constructed that using the timer 54 and the stroke sensor 40 senses the state of completing the retreat operation.

In step S10, a determination is made whether or not a release hydraulic pressure is obtained, which pressure is capable of determining that the brake hydraulic pressure BP has released the front brake BF. If the determination is positive, that is, if it is determined that the occupant has stopped operating the brake lever 45 to thereby release the front brake BF, the process moves to step S11. Herein, the release hydraulic pressure may be set to, for example, a value equivalent to an atmospheric pressure. When the determination is negative in step S10, the process moves back to step S3. In step S11, the timer 54 starts counting. In step S12 that follows, a determination is made whether or not a per-unit-period shift amount ΔS of the stroke amount sensed with the stroke sensor 40 is over 0. If the determination is positive in step S12, that is, if it is determined that the shift amount ΔS is positive, the process moves to step S13. The stroke sensor 40 has a structure in which contracting the front fork 4 reduces the stroke amount, and, on the contrary, expanding the front fork 4 increases the stroke amount. The determination in step S12 depends on the above structure of the stroke sensor 40. The determination in step S12 is for sensing that the shift amount ΔS caused to become positive shows that the contracted front fork 4 has started expanding by the reaction.

In step S13, a determination is made whether or not the shift amount ΔS has become 0, or whether or not a count value t of the timer 54 has become more than or equal to a predetermined value. This operation is for determining that the front fork 4 which started expanding by the reaction has come to an expansion limit to thereby terminate one expansion-contraction movement. Otherwise, this operation is for determining that a predetermined period (for example, 5 minutes) has elapsed from the releasing of the front brake BF and thereby the occupant has no intention for causing the reaction for the retreat operation. If the determination is positive in step S13, the process moves to step S14, in which the damping force is returned to the set value for travel, to thereby terminate the control operations in series. Herein, in a case that the damping force is returned to the set value for travel after the termination of the damping force reducing control, the process may be so made as to return to step S3 to continue, in preparation for the second and third retreat operations, the control operations in series. Further, a supposition of states for releasing the front brake BF during the damping force reducing control includes a case in which the operation for causing the reaction is stopped for the retreat operation, and another case in which the releasing is done in accordance with the timing at which the reaction expands the front fork 4. In any of the above cases, the determination in step S13 can properly terminate the damping force reducing control.

FIG. 4 is a flowchart showing a procedure for terminating the damping force reducing control according to the present invention. This flowchart shows three modified examples of a method for determining a timing for terminating the damping force reducing control. In step 20, the damping force reducing control is in execution. In step S21, a determination is made whether or not the motorcycle 1's retreat operation velocity sensed with the vehicle velocity sensor 27 becomes over a predetermined value. This operation is for determining a formation of a state in which, when the retreat operation velocity during the damping force reducing control is too fast, the damping force reducing control is unnecessary.

Further, if a determination in step S21 is negative, the process moves to step S22. In step S22, a determination is made whether or not the output of the G sensor 20 is less than or equal to a predetermined value. This operation is for determining that the front fork 4 is in a state of expansion limit when the front fork 4's acceleration in the expansion direction becomes less than or equal to the predetermined value in the case of the G sensor 20 estimating and sensing the expansion state of the front fork 4.

Further, if the determination in step S22 is negative, the process moves to step S23. In step S23, a determination is made whether or not a predetermined period (for example, 10 seconds) has elapsed from start of the damping force reducing control. This operation is for determining that, irrespective of whether the front brake BF is released or not, the occupant has no intention for causing a reaction for the retreat operation. According to this terminating condition, even in a case, for example, that any damping force for travel is not generated unless the IG switch is turned on, an elapse of a predetermined period from start of the damping force reducing control can verify the damping force by pressing of the front fork 4.

If the determination in any of steps S21, S22 and S23 is positive, the damping force is made into a set value for travel in step S24, thus terminating the control operations in series. Further, the above modified examples of conditions for terminating the control can be applied in arbitrary combination with the condition for terminating the control shown in FIG. 3.

The above structure shows that the suspension of the motorcycle according to the present embodiment allows the ECU 50 to control the front fork 4's damping force at the time of the expansion movement and contraction movement of the front fork 4. Detecting at least that the motorcycle 1 is in a state of making a stop with "no load" and the brake sensor 43 shows the output of more than or equal to the predetermined value, the ECU 50 carries out the damping force reducing control for reducing the damping force of the front fork 4. The occupant presses the steering handlebar forward while applying the front wheel brake in the stop state to thereby contract the front suspension, and then the occupant drives the motorcycle backward by using the reaction of the front suspension. In the above retreat operation of the motorcycle 1, the damping force accompanying the expansion movement and contraction movement of the front fork is reduced to thereby make it easy to obtain the reaction by the spring. This allows the occupant to easily drive the motorcycle backward with the occupant striding over the motorcycle.

In addition, not limited to those in the above embodiment, the form and structure of each of the motorcycle and the front suspension, the structure of each of the front wheel brake and the ECU, the structure of the damping force adjusting mechanism of the front suspension and the structure of the control solenoid, the structure and mounting position of each of the sensors, the starting condition and terminating condition of the damping force reducing control, and other features may be changed in various manners. For example, the condition for starting the damping force reducing control may be such that the IG switch is on, the engine is making a stop, the vehicle velocity is zero and the front wheel brake is in operation and thereby whether or not the no-load state is present is not included the condition. Further, the condition for terminating the damping force reducing control may be set in a case that the motorcycle starts a forward movement based on an output signal of the vehicle velocity sensor. Further, the front suspension may have a structure other than a telescopic (erect) front fork, an example of the other structure including one featuring that pressing the steering handlebar forward while applying the front wheel brake device allows the front suspension to make a stroke.

REFERENCE SIGNS LIST

1 . . . motorcycle
4 . . . front fork (front suspension)

14 . . . Ne sensor
18 . . . clutch sensor
20 . . . G sensor (acceleration sensor)
27 . . . vehicle velocity sensor
28 . . . neutral sensor
40 . . . stroke sensor
41 . . . fork spring (spring)
42 . . . damper mechanism (damping force generator)
43 . . . brake hydraulic sensor (brake sensor)
44 . . . IG (ignition) switch
45 . . . brake lever
46 . . . damping force adjusting mechanism
50 . . . control device (ECU)
51 . . . damping force control unit
52 . . . damping force reducing control start determining unit
53 . . . damping force reducing control termination determining unit
54 . . . timer
55 . . . control solenoid
56 . . . no-load state sensing unit
WF . . . front wheel
BF . . . front wheel brake device
BP . . . brake hydraulic pressure

What is claimed is:

1. A suspension of a motorcycle comprising:
a front suspension for axially supporting a front wheel;
a spring for giving a reactive force to an expansion movement and a contraction movement of the front suspension;
a damping force generator for giving a damping force to the expansion movement and contraction movement of the front suspension;
a front wheel brake device for giving a braking force to the front wheel; and
a brake sensor for sensing an operation state of the front wheel brake device,
wherein the front suspension is so configured that a control device controls the damping force at the time of the expansion movement and contraction movement, and
when detecting at least that the motorcycle is in a state of making a stop and the brake sensor shows an output of more than or equal to a predetermined value, the control device carries out a damping force reducing control for reducing the damping force of the front suspension.

2. The suspension of the motorcycle according to claim 1 wherein the damping force reducing control is a control for reducing the damping force on a compression side of the front suspension.

3. The suspension of the motorcycle according to claim 2 wherein the damping force reducing control is a control for minimizing the damping force of the front suspension.

4. The suspension of the motorcycle according to claim 3, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

5. The suspension of the motorcycle according to claim 2, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

6. The suspension of the motorcycle according to claim 1 wherein the damping force reducing control is a control for reducing the damping force on an expansion side of the front suspension.

7. The suspension of the motorcycle according to claim 3 wherein the damping force reducing control is a control for minimizing the damping force of the front suspension.

8. The suspension of the motorcycle according to claim 7, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

9. The suspension of the motorcycle according to claim 6, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

10. The suspension of the motorcycle according to claim 1 wherein the damping force reducing control is a control for reducing both of the damping force on a compression side of the front suspension and the damping force on an expansion side of the front suspension.

11. The suspension of the motorcycle according to claim 4 wherein the damping force reducing control is a control for minimizing the damping force of the front suspension.

12. The suspension of the motorcycle according to claim 11, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

13. The suspension of the motorcycle according to claim 10, further comprising:
a stroke sensor for sensing a stroke amount of the front suspension, wherein the control device takes the following sequential steps of:
sensing a start of an expansion movement of the front suspension after starting the damping force reducing control,
sensing a termination of the expansion movement of the front suspension, and
terminating the damping force reducing control.

14. The suspension of the motorcycle according to claim 1 wherein the damping force reducing control is a control for minimizing the damping force of the front suspension.

15. The suspension of the motorcycle according to claim 14, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

16. The suspension of the motorcycle according to claim 1, further comprising:
a stroke sensor for sensing a stroke amount of the front suspension,
wherein the control device takes the following sequential steps of:
sensing a start of an expansion movement of the front suspension after starting the damping force reducing control,
sensing a termination of the expansion movement of the front suspension, and
terminating the damping force reducing control.

17. The suspension of the motorcycle according to claim 1, further comprising:
a timer for measuring a time elapsed from when the brake sensor shows the output value capable of determining that an operation of the front wheel brake device is released, after starting the damping force reducing control,
wherein the control device terminates the damping force reducing control when the elapsed time reaches a predetermined value.

* * * * *